R. H. SWEETSER.
APPARATUS FOR SUPPLYING AIR TO BLAST FURNACES, CONVERTERS, AND THE LIKE.
APPLICATION FILED OCT. 5, 1910.
1,027,781.
Patented May 28, 1912.
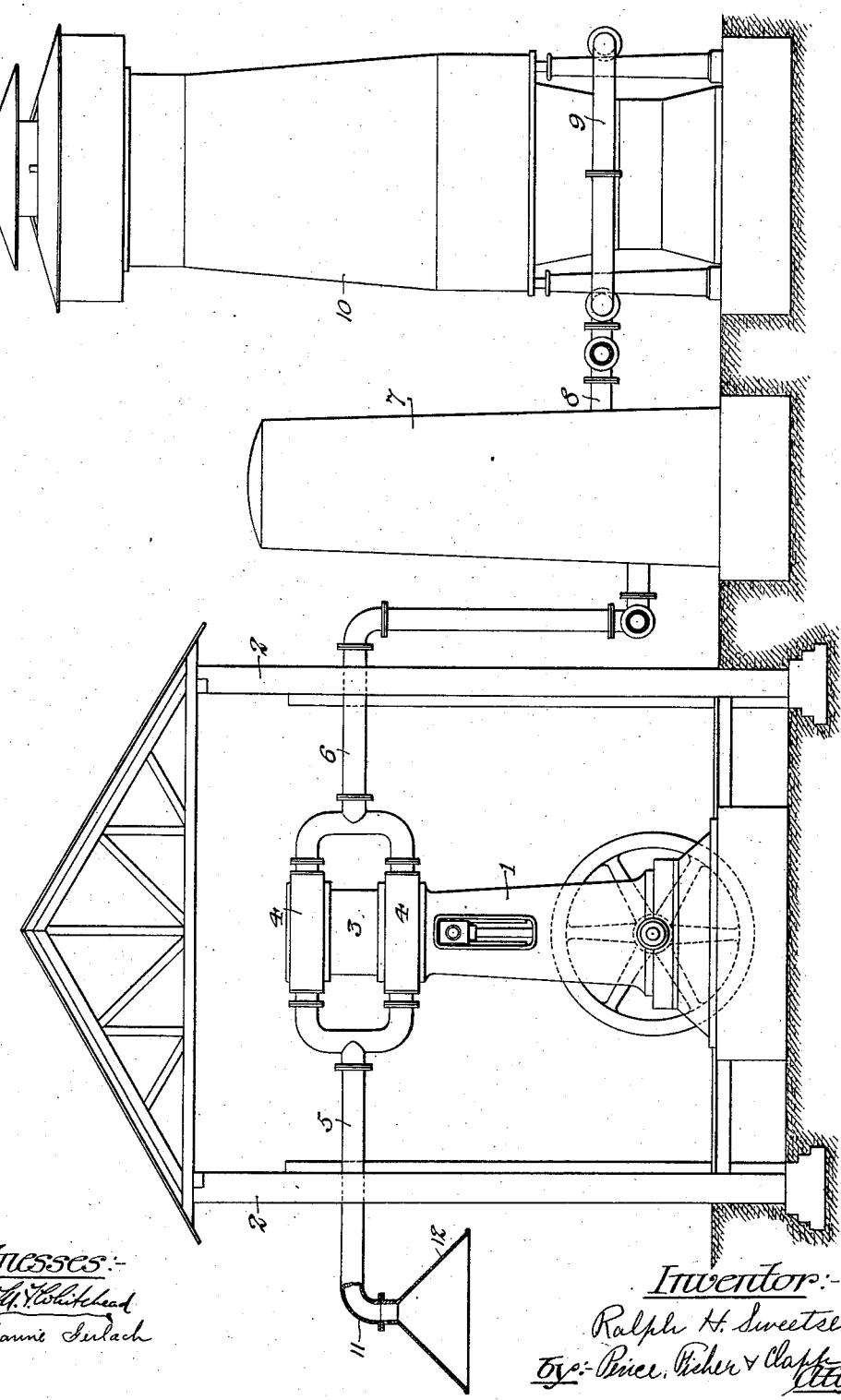

UNITED STATES PATENT OFFICE.

RALPH H. SWEETSER, OF COLUMBUS, OHIO.

APPARATUS FOR SUPPLYING AIR TO BLAST-FURNACES, CONVERTERS, AND THE LIKE.

1,027,781.  Specification of Letters Patent.  Patented May 28, 1912.

Application filed October 5, 1910. Serial No. 585,392.

*To all whom it may concern:*

Be it known that I, RALPH H. SWEETSER, a citizen of the United States, and a resident of the city of Columbus, county of Franklin, and State of Ohio, have invented certain new and useful Improvements in Apparatus for Supplying Air to Blast-Furnaces, Converters, and the Like, of which the following is a full, clear, and exact description.

The invention relates to apparatus for supplying air to blast furnaces, converters and the like and seeks to provide simple and effective means for furnishing a supply of clean, dry air to the blowing engines or air compressors that deliver the air blast to the furnaces or converters.

The invention consists in the features of improvement hereinafter set forth, illustrated in the preferred form in the accompanying drawing and more particularly pointed out in the appended claims.

As has long been known, the moisture content of the air supplied to blast furnaces and converters should be small and as uniform as possible, and that it is advantageous to take the air supply for the blowing engines from a point outside of the building in which the engines are located, since the external air contains less moisture than that in the engine room. I have found in practice that with the usual means employed for taking the air supply from the external atmosphere at a blast furnace plant or steel works, much flue dust, grit and fine particles of ore and coke are drawn into the air intake pipe and cause excessive wear upon the valves, cylinders and pistons of the engines. I have further found that when it is raining or snowing considerable moisture is drawn into the intake pipe and seriously interferes with the operation of the blast furnace or converter.

The apparatus I have devised for obviating these difficulties is illustrated in the drawing.

The blowing engine or air compressor 1 and the inclosing building 2 may be of any suitable form. The cylinder 3 of the blowing engine is provided with air boxes 4 and intake and discharge pipes 5 and 6. The discharge pipe 6 leads to the hot blast stove 7 from whence the pipe 8 leads to the bustle pipe 9 of the blast furnace 10.

The intake pipe 5 extends to a point outside of the building 2 and its outer end is provided with a down-turned elbow 11. An enlarged intake hood 12 of flaring conical form depends from the elbow 11 and communicates therewith at its upper central portion. The open bottom of the hood forms an air inlet several times larger in area than the cross section of the intake pipe.

At a blast furnace plant or steel works, flue dust and fine particles of ore and coke are delivered into the atmosphere at considerable height and fall to the ground. This falling dust and grit, and rain drops and snow are prevented from entering the intake pipe by its down turn inlet end and by the conical hood. Moreover, dust and rain cannot readily be drawn into the intake pipe by suction since the velocity of the air at the greatly enlarged air inlet is much less than that through the intake pipe and the suction at the periphery of the inverted hood is insufficient to divert the falling dust and rain and draw it up into the intake pipe against the force of gravity. That is to say, falling grit, rain drops and snow must be drawn up into the inverted hood around the edge of its enlarged lower end and the velocity of the air current at this point is so slight that, as found in practice, only a very small amount of dust enters the intake pipe and little additional moisture is drawn in when it is raining or snowing.

It is obvious that the details set forth may be varied without departure from the essentials of the invention as defined in the claims.

I claim as my invention:—

1. The combination of a blowing engine for supplying air to blast furnaces and the like inclosed in a building, an intake pipe for said engine leading from a point outside of the building, and a down-turned intake hood connecting at its upper end with the outer end of said intake pipe and having an enlarged air inlet at its lower end, substantially as described.

2. The combination of a blowing engine for supplying air to blast furnaces and the like inclosed in a building, an intake pipe for said engine leading from a point outside of said building and having a down-turned elbow at its outer end and a downwardly flaring hood depending from said elbow, substantially as described.

RALPH H. SWEETSER.

Witnesses:
HARRY McBRIDE MOORE,
GORDON BATTELLE.